(12) United States Patent
Dornstetter et al.

(10) Patent No.: US 7,257,174 B2
(45) Date of Patent: Aug. 14, 2007

(54) METHOD FOR PROCESSING A DIGITAL INPUT SIGNAL OF A CHANNEL EQUALIZER

(75) Inventors: Jean-Louis Dornstetter, Choisel (FR); Nidham Ben Rached, Paris (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 752 days.

(21) Appl. No.: 10/343,137

(22) PCT Filed: Jul. 26, 2001

(86) PCT No.: PCT/FR01/02458

§ 371 (c)(1),
(2), (4) Date: Aug. 8, 2003

(87) PCT Pub. No.: WO02/11378

PCT Pub. Date: Feb. 7, 2002

(65) Prior Publication Data

US 2004/0028155 A1 Feb. 12, 2004

(30) Foreign Application Priority Data

Jul. 28, 2000 (FR) .................................. 00 09954

(51) Int. Cl.
*H03D 1/00* (2006.01)
(52) U.S. Cl. ...................... 375/343; 375/346; 375/341; 370/347; 370/340

(58) Field of Classification Search ................ 375/343, 375/232, 346, 341; 370/347, 340
See application file for complete search history.

(56) References Cited

U.S. PATENT DOCUMENTS

| 6,590,932 B1* | 7/2003 | Hui et al. ..................... 375/232 |
| 6,990,692 B1* | 1/2006 | Park ............................ 2/195.6 |
| 2005/0031061 A1* | 2/2005 | Ojard et al. ................. 375/346 |

FOREIGN PATENT DOCUMENTS

| EP | 0 801 484 | 10/1997 |
| EP | 0 939 525 | 9/1999 |

* cited by examiner

*Primary Examiner*—Chieh M. Fan
*Assistant Examiner*—Eva Zheng
(74) *Attorney, Agent, or Firm*—Trop, Pruner & Hu, P.C.

(57) ABSTRACT

A baseband digital signal block is processed at an output of a matched filter and at an input of a channel equalizer. This signal is fed to a whitening filter estimated for the block by taking into account interfering signals in the frequency band of the useful signal and in one or more adjacent bands. To this end, an autocorrelation vector, calculated form the block of received signal is projected onto different directions corresponding to predetermined correlation vectors relating to the useful signal, to signals which may be present in the adjacent bands and to the thermal noise. The coefficients of the whitening filter are then derived from the sum of the projected vectors, by taking into account the energy of the useful signal if the latter has not been cancelled prior to the computation of the autocorrelations.

12 Claims, 3 Drawing Sheets

METHOD FOR PROCESSING A DIGITAL INPUT SIGNAL OF A CHANNEL EQUALIZER

BACKGROUND OF THE INVENTION

The present invention relates to the field of radiocommunications and in particular to the processing performed in a receiver upstream of a digital equalizer.

It applies in systems where the available spectrum is subdivided into adjacent frequency bands so as to support different communications.

An example is the so-called GSM ("Global System for Mobile communications") European cellular radiocommunication system in which the spectrum allocated around 900 or 1800 MHz is subdivided into frequency bands spaced 200 kHz apart, each of these bands forming the subject of a time-division multiplexing according to the TDMA scheme ("Time Division Multiple Access"). The GSM system uses a frequency hopping technique to combat the channel fading and to increase the capacity of the system. GSM frequency hopping consists, for a communication set up on a TDMA channel defined in particular by a given time slot of successive TDMA frames, in changing the communication frequency from one frame to the next from among the carriers, spaced 200 kHz apart, allocated to the system, according to a hopping pattern which is known to the transmitter and to the receiver.

In a radiocommunication receiver, the filtering operations performed upstream of the channel equalizer may correspond to a fixed or adaptive filter.

The specification of a fixed filter depends on the assumptions made about the noise and the interferers. If the filter is optimized to enhance the performance in terms of sensitivity, then the robustness of the receiver to interferers which may be present in the adjacent frequency channels is decreased. Conversely, an excellent filter as regards robustness to interferers in the adjacent channels degrades the performance in terms of sensitivity.

An adaptive filter makes it possible to achieve a better compromise. However, the use of an adaptive filter has hitherto been possible only in the case of stationary channels, making it possible to determine the reception filter in a reliable manner.

In certain cases, this stationarity condition is not fulfilled. For example, in the GSM system, the frequency hopping at the TDMA frame rate of 4.615 ms, carried out between two signal bursts transmitted in two successive frames, constantly modifies the interference conditions and therefore the optimal structure of the reception filter.

It is conventional to decompose the filtering upstream of the channel equalizer into the cascading of a filter matched to the spectrum of the modulation and of a filter in the Nyquist band, referred to as "whitening" filter. This whitening filter must guarantee noise residuals (thermal noise+interference of the other channels) which are as independent as possible at the input of the channel equalizer. It is known that this structure affords an optimal protection scheme (see G. D. Forney Jr.: "Maximum-Likelihood Sequence Estimation of Digital Sequences in the Presence of Intersymbol Interference", IEEE Trans. Inform. Theory, Vol. IT-18, May 1972, pages 363-378).

The present invention aims to allow adaptive estimation of the whitening filter, even in the presence of a weakly stationary transmission channel, such as that of GSM.

SUMMARY OF THE INVENTION

The invention thus proposes a method of processing a baseband digital signal block at an output of a filter matched to a radio transmission channel and at an input of a channel equalizer, wherein the baseband signal is fed to a whitening filter estimated for the block by a procedure comprising the steps of:

calculating an autocorrelation vector of the baseband signal;
determining a modified autocorrelation vector as a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said modified autocorrelation vector;

estimating a noise autocorrelation vector by subtracting the first vector multiplied by an energy estimation of the useful signal from the modified autocorrelation vector; and estimating coefficients of the whitening filter from the estimated noise autocorrelation vector.

Alternatively, the procedure for estimating the whitening filter comprises the steps of:

estimating a noise sequence included in the baseband signal block and superimposed on a known signal sequence;
calculating an autocorrelation vector of the estimated noise sequence;
estimating a noise autocorrelation vector in the form of a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated noise autocorrelation vector; and estimating coefficients of the whitening filter from the estimated noise autocorrelation vector.

The estimation of the whitening filter takes account of the structure of the disturbing signals in the frequency band of the useful signal (co-channel interference due to the reuse of the frequencies, and broadband thermal noise) and in one or more adjacent frequency bands (interference from adjacent channels, and broadband thermal noise).

The calculated autocorrelation vector (of the baseband signal, or alternatively of the estimated noise sequence) is projected onto various directions which correspond to predetermined correlation vectors relating to the useful signal (and to the co-channel interferers) and to the signals liable to be present in the adjacent channels. This projection amounts to a least squares optimization which eliminates the autocorrelation vector estimation errors, and thus allows reliable estimation of the whitening filter, even if just one block of the signal is available to perform this estimation.

The size of the block is chosen in such a way that the interference conditions are substantially stationary over the duration of a block. In the case of a GSM type signal, a block will typically correspond to a signal burst transmitted in a time slot of the TDMA frame. Between two successive bursts, the communication frequency can change, thereby modifying the conditions of co-channel interference and interference in the adjacent channels.

Another aspect of the present invention pertains to a device for processing a baseband digital signal in a radiocommunication receiver, comprising a whitening filter for receiving the baseband signal at an output of a filter matched to a transmission channel and for supplying a filtered signal to a channel equalizer, and means of estimation of the whitening filter for a block of the baseband signal.

For the implementation of the first method above, the means of estimation of the whitening filter comprise:
means for calculating an autocorrelation vector of the baseband signal;
means for determining a modified autocorrelation vector as a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said modified autocorrelation vector;
means of estimation of a noise autocorrelation vector by differencing between the modified autocorrelation vector and the first vector multiplied by an energy estimation of the useful signal; and
means of estimation of the coefficients of the whitening filter from the estimated noise autocorrelation vector.

For the implementation of the aforesaid alternative method, the means of estimation of the whitening filter comprise:
means of estimation of a noise sequence included in the baseband signal block and superimposed on a known signal sequence;
means for calculating an autocorrelation vector of the estimated noise sequence;
means of estimation of a noise autocorrelation vector in the form of a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated noise autocorrelation vector; and
means of estimation of coefficients of the whitening filter from the estimated noise autocorrelation vector.

DESCRIPTION OF PREFERRED EMBODIMENTS

Figure 1:
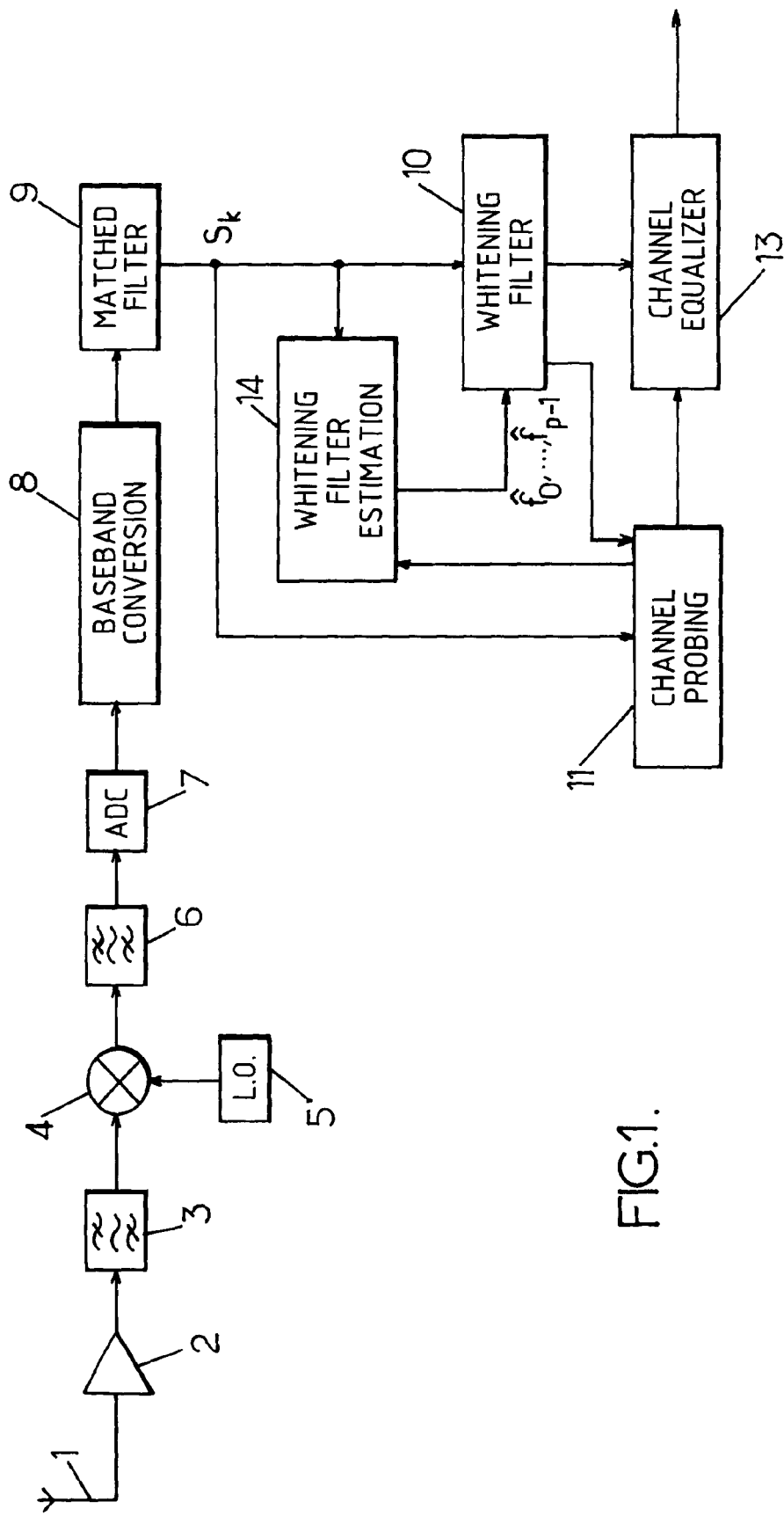
FIG. 1 is a schematic diagram of a radiocommunication receiver implementing the present invention.

The receiver represented in FIG. 1 comprises an antenna 1 for picking up radio signals. In the remainder of the present description, these radio signals will be regarded as of GSM type, without this being limiting.

GSM uses a plurality of carrier frequencies having spaced by 200 kHz. The spectral shaping of the signals is designed to minimize the interference between the adjacent frequency channels. However, an interference residual persists which adds to the noise picked up in the band of the useful signal. Moreover, a residual of co-channel interference due to other communications on the same carrier frequency in a distant cell also persists on account of the reuse of the frequencies in geographically separated cells. These disturbances get added to the broadband thermal noise.

The modulation used to send the GSM signal can be of GMSK type ("Gaussian Minimum Shift Keying") for traditional GSM channels, or of EDGE type ("Enhanced Data for GSM Evolution").

The radio signal picked up by the antenna 1 is amplified by an amplifier 2, then subjected to a bandpass filtering by a radiofrequency filter 3. This signal is transposed to an intermediate frequency by a mixer 4 which mixes it with a wave delivered by a local oscillator 5. A bandpass filter 6 retains only the useful frequency component at the output of the mixer 4, and the resulting intermediate frequency signal is digitized by an analog/digital converter 7.

The intermediate frequency digital signal is converted into baseband, by taking account of the frequency hopping pattern relating to the relevant communication, then fed to a matched filtering. In FIG. 1, the baseband conversion and matched filtering operations are shown diagrammatically by two distinct modules 8, 9. In practice, the same module can effect both operations.

The matched filter 9 has a response matched to that of the various filters used at the transmitter of the signal, as well as those 3, 6 of the receiver. If c(t) denotes the waveform of the shaping pulse, integrating the filters of the receiver, the matched filter 9 essentially performs a convolution of the baseband signal with the response $c^*(\tau-t)$, where $\tau$ is a propagation delay. Of course, the pulse c(t) differs depending on whether the signal sent is of GMSK or EDGE type.

The output signal from the matched filter 9 is sampled at the frequency of the symbols sent. The samples of a signal block corresponding to a TDMA burst are denoted $S_k$, for $0 \leq k < L$. The block is composed of L=148 symbols, the L'=26 central symbols being symbols known a priori forming a learning sequence.

The baseband signal $S_k$ delivered by the matched filter 9 is fed on the one hand to a whitening filter 10 and on the other hand to a propagation channel probing module 11.

The channel probing module 11 estimates in a known manner the impulse response of the transmission channel over a length of L"+1 samples (the memory of the channel being for example L"=4), and, after convolution with that of the whitening filter, supplies it to the channel equalizer 13 which processes the signal delivered by the whitening filter 10. The channel equalizer 13 operates for example according to the Viterbi algorithm (see G. D. Forney Jr.: "The Viterbi Algorithm", Proc. of the IEEE, Vol. 61, No. 3, March 1973, pages 268-278). Its output signal is supplied to the decoders situated downstream of the receiver for utilization.

The role of the whitening filter 10 is to impart a uniform spectrum to the residual noise of the signal emanating from the matched filter 9, thereby affording the best performance of the channel equalizer 13.

In a known manner, if K(z) denotes the z transform of the autocorrelation vector of the noise and if K(z) is factorized in the form $K(z)=R(z) \cdot R(z^{-1})^*$, then the z transform of the optimal whitening filter is given by $F(z)=1/R(z)$.

If the whitening filter 10 is constructed with a finite impulse response of length p (for example p=4), then this response $$F = \begin{pmatrix} f_0 \\ f_1 \\ f_2 \\ \vdots \\ f_{p-1} \end{pmatrix}$$

is obtained by inverting the noise autocorrelation matrix H. It is for example the first column of the matrix $H^{-1}$:

$$F = H^{-1} \cdot e_1 \quad (1)$$

with $$e_1 = \begin{pmatrix} 1 \\ 0 \\ 0 \\ \vdots \\ 0 \end{pmatrix} \text{ and } H = \begin{pmatrix} K_0 & K_1^* & K_2^* & \cdots & K_{p-1}^* \\ K_1 & K_0 & K_1^* & \ddots & \vdots \\ K_2 & K_1 & K_0 & \ddots & K_2^* \\ \vdots & \ddots & \ddots & \ddots & K_1^* \\ K_{p-1} & \cdots & K_2 & K_1 & K_0 \end{pmatrix}$$

The autocorrelation vector $$K = \begin{pmatrix} K_0 \\ K_1 \\ K_2 \\ \vdots \\ K_{p-1} \end{pmatrix}$$

determines the first column of the matrix H which is Hermitian and of Toeplitz structure.

The problem of the estimation of the optimal whitening filter can 10 therefore be reduced to the problem of the correct estimation of the noise autocorrelation vector K over a single signal burst.

This problem is dealt with by the estimation module 14 of the receiver which solves it by using a priori information about the interferers (co-channel and in the adjacent channels).

The module 14 seeks to model the spectrum of the colored noise present at the output of the matched filter 9 as being the mixture of Q+Q'+2 distinct spectra corresponding respectively:

to the co-channel interference (band q=0);
to the thermal noise;
to the interference emanating from channels corresponding to Q adjacent frequency bands below that of the relevant channel (bands q<0);
to the interference emanating from channels corresponding to Q' adjacent frequency bands above that of the relevant channel (bands q>0).

In a typical embodiment, we shall take Q=Q'=1. It would be possible to take Q=0 (respectively Q'=0) in the case of a channel situated at the bottom end (respectively top end) of the GSM spectrum, but this is not compulsory.

$M_q$ denotes the column vector of size p whose components are the normalized correlations of orders 0 to p−1 of the signal of band 0 with the signal originating from band q after the matched filtering ($-Q \leq q \leq Q'$). Furthermore, $M_N$ denotes the column vector of size p whose components are the normalized correlations of orders 0 to p−1 of the signal of band 0 with the thermal noise after the matched filtering, and M denotes the p×(Q+Q'+2) matrix given by $M=(M_{-Q}, M_{-Q+1}, \ldots, M_{Q'}, M_N)$.

All the components of the vectors $M_q$ and $M_N$, and hence of the matrix M are constants known a priori. They depend simply on the spectrum of the modulation and the filtering elements of the transmission chain. One possibility is to calculate them from pulse shapes measured over a specimen of the receiver at the output of the matched filter 9. These constants are determined once and for all (calculated and/or measured) and stored by the estimation module 14.

The module 14 performs an estimation of the autocorrelation vector of the signal received in the form of a linear combination of the Q+Q'+2 vectors $M_q$ ($-Q \leq q \leq Q'$) and $M_N$. This estimation consists of a projection onto the space spanned by these Q+Q'+2 vectors, this amounting to minimizing the autocorrelation vector estimation noise.

The autocorrelation vector X such as observed by the receiver is decomposed into the form:

$$X = \sum_{q=-Q}^{Q'} a_q \cdot M_q + N_0 \cdot M_N + W \quad (2)$$

and the estimation reduces to that of the coefficients $a_{-Q}, a_{-Q+1}, \ldots, a_{Q'}$, et $N_0$.

Denoting the vector composed of these Q+Q'+2 estimations by $$\hat{A} = \begin{pmatrix} \hat{a}_{-Q} \\ \vdots \\ \hat{a}_0 \\ \vdots \\ \hat{a}_{Q'} \\ \hat{N}_0 \end{pmatrix}$$

the minimizing of the energy of the estimation noise W consists in taking:

$$\hat{A} = Re(M^H M)^{-1} Re(M^H X) \quad (3)$$

where Re(.) denotes the real part and $(.)^H$ the conjugate transpose. The estimated autocorrelation vector is then $\hat{X} = M \cdot \hat{A}$, i.e. a sum of the predetermined vectors $M_{-Q}, M_{-Q+1}, \ldots, M_{Q'}, M_N$ respectively weighted by the coefficients $\hat{a}_{-Q}, \hat{a}_{-Q+1}, \ldots, \hat{a}_{Q'}$, and $\hat{N}_0$.

Figure 2:
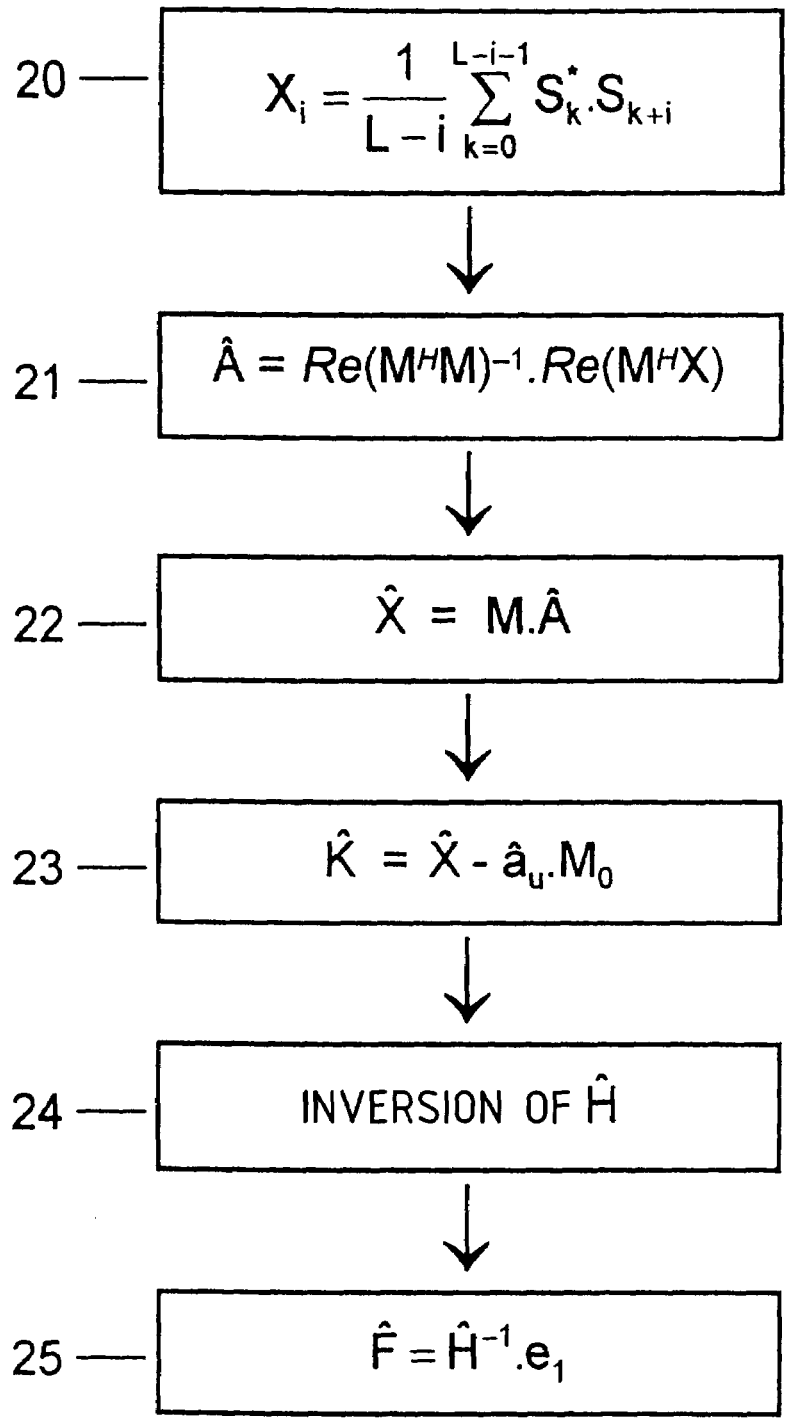
FIGS. 2 and 3 are flowcharts of whitening filter estimation procedures which can be used in the receiver of FIG. 1.

In the embodiment illustrated by FIG. 2, the autocorrelation vector X on which the estimation module 14 operates is composed of autocorrelations of the samples $S_k$ of the output signal from the matched filter 9, these autocorrelations being calculated in step 20 over the length L of the signal burst:

$$X_i = \frac{1}{L-i} \sum_{k=0}^{L-i-1} S_k^* \cdot S_{k+i} \qquad (4)$$

In step 21, the vector of coefficients $\hat{A}$ is estimated according to relation (3), the matrices $M^H$ and $Re(M^H M)^{-1}$ having been calculated once and for all and stored in the module 14. In step 22, the estimated autocorrelation vector $\hat{X}$ is obtained by forming the product of the matrix M times the vector $\hat{A}$ calculated previously.

Among the operations performed by the channel probing module 11, there is the estimation of the per-symbol energy of the useful signal contained in the received signal. This energy $\hat{a}_u$ is typically estimated by correlation on the basis of a known learning sequence inserted into the signal block sent. The energy estimation $\hat{a}_u$ is supplied to the module 14 which obtains the estimation of the autocorrelation vector $\hat{K}$ of the noise by subtracting the vector $\hat{a}_u \cdot M_0$ from $\hat{X}$ in step 23.

The module 14 then constructs the Toeplitz Hermitian matrix $\hat{H}$ from the estimated autocorrelation vector $\hat{K}=\hat{X}-\hat{a}_u \cdot M_0$ ($\hat{K}$ is the first column of $\hat{H}$), then it proceeds to the inversion of the matrix $\hat{H}$ in step 24. To carry out this inversion, various conventional algorithms for inverting Toeplitz matrices may be used, such as for example the Levinson-Durbin algorithm. In step 25, the module 14 obtains the estimation $\hat{F}$ of the whitening filter as in relation (1): $\hat{F}=\hat{H}^{-1} \cdot e_1$.

The components $\hat{f}_0, \hat{f}_1, \ldots, \hat{f}_{p-1}$ of this vector $\hat{F}$ are supplied to the whitening filter 10 so that it applies them to the finite impulse response filtering of the current signal block.

Figure 3:
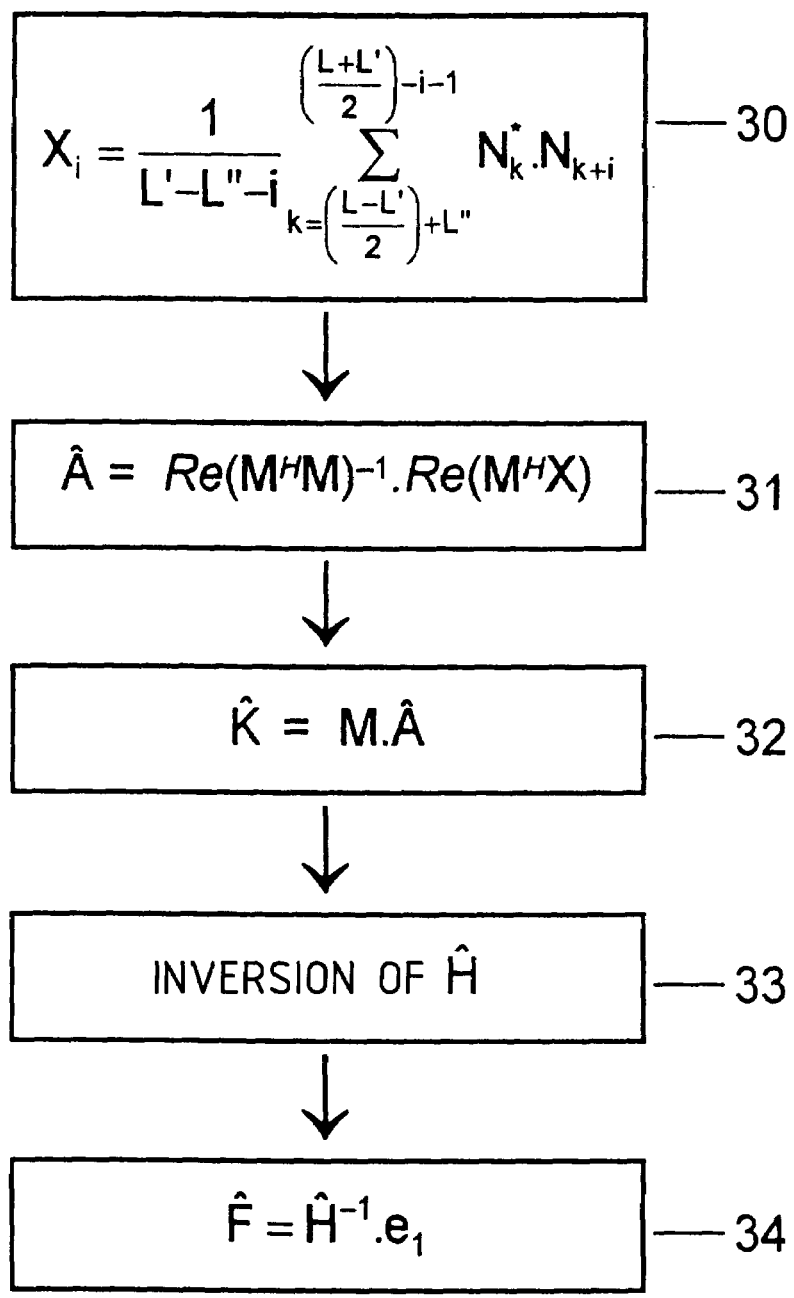

In the alternative embodiment represented in FIG. 3, the autocorrelations $X_i$ are calculated directly on the basis of an estimated noise sequence obtained by the channel probing module 11. These estimations of the noise $N_k$ are obtained by the module 11 only for the samples k corresponding to the learning sequence, without influence of the unknown information symbols, i.e. for $(L-L')/2+L'' \leq k < (L+L')/2$. They are obtained by subtracting the learning sequence convolved with the estimated impulse response of the channel from the corresponding samples $S_k$.

The calculation of the autocorrelations $X_i$ is performed in step 30 according to:

$$X_i = \frac{1}{L'-L''-i} \sum_{k=\left(\frac{L-L'}{2}\right)+L''}^{\left(\frac{L+L'}{2}\right)-i-1} N_k^* \cdot N_{k+i} \qquad (5)$$

In step 31, the module 14 calculates the vector $\hat{A}$ according to relation (3), then the estimation $\hat{K}$ of the autocorrelation vector of the noise is obtained directly in step 32 by the product $M \cdot \hat{A}$, the useful component having already been removed.

The procedure according to FIG. 3 terminates with the inverting of the matrix $\hat{H}$ (step 33) and with the obtaining of the components of the vector $\hat{F}$ in step 34. These steps 33 and 34 are executed in the same way as steps 24 and 25 in the embodiment according to FIG. 2.

It has been observed that the above method, allowing optimization of the whitening filter upstream of a Viterbi equalizer, afforded an appreciable improvement in the robustness of the receiver to interference. In the example of GSM in an urban environment with GMSK modulation, the improvement in the channel-to-interferers ratio (C/I) for a binary error rate (BER) of 1% may reach several decibels for the co-channel interferers and of the order of some ten decibels for the interferers in the adjacent channels.

What is claimed is:

1. A method of processing a baseband digital signal block at an output of a filter matched to a radio transmission channel and at an input of a channel equalizer, wherein the baseband signal is fed to a whitening filter estimated for the block by a procedure comprising the steps of:
   calculating an autocorrelation vector of the baseband signal;
   determining an estimated autocorrelation vector as a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated autocorrelation vector,
   estimating a noise autocorrelation vector by subtracting the first vector multiplied by an energy estimation of the useful signal from the estimated autocorrelation vector;
   estimating coefficients of the whitening filter from the estimated noise autocorrelation vector;
   applying the estimated coefficients to the whitening filter; and
   filtering the baseband signal.

2. A method of processing a baseband digital signal block at an output of a filter matched to a radio transmission channel and at an input of a channel equalizer, wherein the baseband signal is fed to a whitening filter estimated for the block by a procedure comprising the steps of:
   estimating a noise sequence included in the baseband signal block and superimposed on a known signal sequence;
   calculating an autocorrelation vector of the estimated noise sequence;
   estimating a noise autocorrelation vector in the form of a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated noise autocorrelation vector;
   estimating coefficients of the whitening filter from the estimated noise autocorrelation vector;

applying the estimated coefficients to the whitening filter; and filtering the baseband signal.

3. The method as claimed in claim 1, wherein the estimation of the coefficients of the whitening filter comprises the steps of:

forming a Toeplitz Hermitian matrix having a first column defined by the estimated noise autocorrelation vector;

inverting said matrix;

extracting the estimated coefficients of the whitening filter from the first column of the inverted matrix.

4. The method as claimed in claim 1, wherein each baseband digital signal block corresponds to a GSM signal burst.

5. A device for processing a baseband digital signal in a radiocommunication receiver, comprising a whitening filter for receiving the baseband signal at an output of a filter matched to a transmission channel and for supplying a filtered signal to a channel equalizer, and means of estimation of the whitening filter for a block of the baseband signal, wherein the means of estimation of the whitening filter comprise:

means for calculating an autocorrelation vector of the baseband signal;

means for determining an estimated autocorrelation vector as a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated autocorrelation vector;

means of estimation of a noise autocorrelation vector by differencing between the estimated autocorrelation vector and the first vector multiplied by an energy estimation of the useful signal; and means of estimation of the coefficients of the whitening filter from the estimated noise autocorrelation vector.

6. A device for processing a baseband digital signal in a radiocommunication receiver, comprising a whitening filter for receiving the baseband signal at an output of a filter matched to a transmission channel and for supplying a filtered signal to a channel equalizer, and means of estimation of the whitening filter for a block of the baseband signal, wherein the means of estimation of the whitening filter comprise:

means of estimation of a noise sequence included in the baseband signal block and superimposed on a known signal sequence;

means for calculating an autocorrelation vector of the estimated noise sequence;

means of estimation of a noise autocorrelation vector in the form of a sum of predetermined vectors weighted by respective coefficients, the predetermined vectors comprising a first vector representative of an autocorrelation of a useful signal in a first frequency band, at least one second vector representative of a correlation of the useful signal with a disturbance from at least one channel situated in a second frequency band adjacent to the first band and a third vector representative of a correlation of the useful signal with a thermal noise component, said coefficients being chosen to minimize a deviation between the calculated autocorrelation vector and said estimated noise autocorrelation vector; and means of estimation of coefficients of the whitening filter from the estimated noise autocorrelation vector.

7. The device as claimed in claim 5, wherein the means of estimation of the coefficients of the whitening filter comprise means for forming a Toeplitz Hermitian matrix having a first column defined by the estimated noise autocorrelation vector, means for inverting said matrix and means for extracting the estimated coefficients of the whitening filter from the first column of the inverted matrix.

8. The device as claimed in claim 5, wherein each baseband digital signal block corresponds to a GSM signal burst.

9. The method as claimed in claim 2, wherein the estimation of the coefficients of the whitening filter comprises the steps of:

forming a Toeplitz Hermitian matrix having a first column defined by the estimated noise autocorrelation vector;

inverting said matrix;

extracting the estimated coefficients of the whitening filter from the first column of the inverted matrix.

10. The method as claimed in claim 2, wherein each baseband digital signal block corresponds to a GSM signal burst.

11. The device as claimed in claim 6, wherein the means of estimation of the coefficients of the whitening filter comprise means for forming a Toeplitz Hermitian matrix having a first column defined by the estimated noise autocorrelation vector, means for inverting said matrix and means for extracting the estimated coefficients of the whitening filter from the first column of the inverted matrix.

12. The device as claimed in claim 6, wherein each baseband digital signal block corresponds to a GSM signal burst.

* * * * *